(12) United States Patent
Budinscak, Jr. et al.

(10) Patent No.: US 10,316,515 B2
(45) Date of Patent: Jun. 11, 2019

(54) STRUCTURAL INSULATED SHEATHING

(71) Applicant: Owens Corning Intellectual Capital, LLC, Toledo, OH (US)

(72) Inventors: John Frank Budinscak, Jr., Wadsworth, OH (US); Matthew Daniel Gawryla, Chagrin Falls, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/418,857

(22) Filed: Jan. 30, 2017

(65) Prior Publication Data

US 2017/0241135 A1  Aug. 24, 2017

Related U.S. Application Data

(60) Provisional application No. 62/288,758, filed on Jan. 29, 2016.

(51) Int. Cl.
*E04C 2/24* (2006.01)
*B32B 5/02* (2006.01)
(Continued)

(52) U.S. Cl.
CPC ............ *E04C 2/243* (2013.01); *B32B 5/02* (2013.01); *B32B 5/022* (2013.01); *B32B 5/024* (2013.01);
(Continued)

(58) Field of Classification Search
CPC .... B32B 5/02; B32B 5/18; B32B 7/12; B32B 2307/304; B32B 2607/00; B32B 5/022; B32B 5/024; B32B 5/245; B32B 21/047; B32B 27/065; B32B 29/007; B32B 2250/02; B32B 2250/44; B32B 2260/021; B32B 2260/046; B32B 2262/062;
(Continued)

(56) References Cited

U.S. PATENT DOCUMENTS 3,492,196 A * 1/1970 Moore ................. E04D 5/10
                                              156/71
3,871,147 A * 3/1975 Stegmeier ........... E04H 4/141
                                              249/20
(Continued)

FOREIGN PATENT DOCUMENTS

CA      1194706    10/1985
CA      1279459     1/1991
(Continued)

OTHER PUBLICATIONS

Thermo-ply Structural Sheathing, OX Industries Engineered Products brochure, 4 pgs., dated at least as early as the filing date of this application.
(Continued)

*Primary Examiner* — James M Ference
(74) *Attorney, Agent, or Firm* — Calfee, Halter & Griswold LLP (57) ABSTRACT

A structural insulated sheathing including a rigid foam insulation board having a first face, a structural member having a second face, wherein the first face of the foam insulation board is laminated to the second face of the structural member over substantially 100% of the interface between the first face and the second face.

8 Claims, 6 Drawing Sheets

(51) Int. Cl.

| | | |
|---|---|---|
| *B32B 5/18* | (2006.01) | |
| *B32B 7/12* | (2006.01) | |
| *E04B 2/00* | (2006.01) | |
| *E04F 13/08* | (2006.01) | |
| *B32B 5/24* | (2006.01) | |
| *B32B 21/04* | (2006.01) | |
| *B32B 27/06* | (2006.01) | |
| *B32B 29/00* | (2006.01) | |
| *E04B 1/80* | (2006.01) | |
| *E04B 2/70* | (2006.01) | |

(52) U.S. Cl.
CPC .............. *B32B 5/18* (2013.01); *B32B 5/245* (2013.01); *B32B 7/12* (2013.01); *B32B 21/047* (2013.01); *B32B 27/065* (2013.01); *B32B 29/007* (2013.01); *E04B 1/80* (2013.01); *E04B 2/707* (2013.01); *E04C 2/246* (2013.01); *E04C 2/46* (2013.01); *E04F 13/0862* (2013.01); *E04F 13/0896* (2013.01); *E04F 13/0898* (2013.01); *B32B 2250/02* (2013.01); *B32B 2250/44* (2013.01); *B32B 2260/021* (2013.01); *B32B 2260/046* (2013.01); *B32B 2262/062* (2013.01); *B32B 2262/101* (2013.01); *B32B 2266/025* (2013.01); *B32B 2266/0228* (2013.01); *B32B 2266/0278* (2013.01); *B32B 2266/06* (2013.01); *B32B 2266/08* (2013.01); *B32B 2272/00* (2013.01); *B32B 2307/304* (2013.01); *B32B 2307/50* (2013.01); *B32B 2307/542* (2013.01); *B32B 2307/7242* (2013.01); *B32B 2419/00* (2013.01); *B32B 2607/00* (2013.01)

(58) Field of Classification Search
CPC ...... B32B 2262/101; B32B 2266/0228; B32B 2266/025; B32B 2266/0278; B32B 2266/06; B32B 2266/08; B32B 2272/00; B32B 2037/304; B32B 2307/50; B32B 2307/542; B32B 2307/7242; B32B 2419/00; E04C 2/243; E04C 2/46; E04C 2/246; E04F 13/0862; E04F 13/0896; E04F 13/0898; E04B 1/80; E04B 2/707
See application file for complete search history.

(56) References Cited

U.S. PATENT DOCUMENTS

| | | | | |
|---|---|---|---|---|
| 4,033,802 A * | 7/1977 | Culpepper, Jr. | ........ | B21D 39/00 156/256 |
| 4,333,290 A * | 6/1982 | Koberstein | ............ | E04B 1/7612 52/309.2 |
| 4,334,394 A * | 6/1982 | Mader | ...................... | E04F 13/04 52/309.12 |
| 4,471,591 A * | 9/1984 | Jamison | ................... | E04B 1/10 264/46.4 |
| 4,564,554 A * | 1/1986 | Mikuski | ................... | B32B 5/24 428/292.4 |
| 4,578,915 A * | 4/1986 | Schneller | ................ | B32B 13/12 52/309.12 |
| 4,586,304 A * | 5/1986 | Flamand | ................. | E04F 13/18 52/309.8 |
| 4,646,498 A * | 3/1987 | Schneller | ................. | E04B 2/92 52/309.12 |
| 4,653,246 A * | 3/1987 | Hepler | .................. | E04B 1/7629 52/309.2 |
| 4,786,547 A * | 11/1988 | St-Michel | ............... | B32B 21/02 428/215 |
| 4,866,897 A * | 9/1989 | Yount | .................... | B32B 29/02 52/363 |
| 4,969,302 A * | 11/1990 | Coggan | ............... | E04F 13/0864 52/309.8 |
| 5,220,760 A * | 6/1993 | Dimakis | .................. | B32B 5/18 52/309.9 |
| 5,236,757 A * | 8/1993 | Probst | ...................... | B27N 3/04 156/62.2 |
| 5,367,847 A * | 11/1994 | Hepler | .................... | E04C 2/296 428/319.9 |
| 5,516,580 A * | 5/1996 | Frenette | .................. | D04H 1/54 428/359 |
| 6,001,452 A * | 12/1999 | Bassett | ..................... | B27B 1/00 428/105 |
| 6,125,608 A * | 10/2000 | Charlson | ............... | E04B 1/7604 52/404.1 |
| 6,128,879 A * | 10/2000 | Bussey, Jr. | ............... | E04B 1/762 52/267 |
| 6,308,491 B1 * | 10/2001 | Porter | ..................... | B32B 5/18 52/309.16 |
| 6,599,621 B2 * | 7/2003 | Porter | ..................... | B32B 5/18 428/107 |
| 6,656,858 B1 * | 12/2003 | Cahill | ....................... | B32B 5/18 428/221 |
| 6,715,249 B2 * | 4/2004 | Rusek | ..................... | E04B 1/762 428/105 |
| 6,901,713 B2 * | 6/2005 | Axsom | ..................... | E04B 1/80 52/309.17 |
| 8,176,701 B2 * | 5/2012 | Cullen | ...................... | B32B 3/06 52/506.1 |
| 8,287,997 B2 * | 10/2012 | Paradis | ................... | E04C 2/296 428/315.9 |
| 8,938,927 B1 * | 1/2015 | Bragg | ................. | E04F 13/0803 52/483.1 |
| 8,966,845 B1 | 3/2015 | Ciuperca | | |
| 9,212,481 B2 | 12/2015 | Stramandinoli | | |
| 9,476,202 B2 | 10/2016 | Clancy et al. | | |
| 2003/0041544 A1* | 3/2003 | Rusek, Jr. | ............... | E04B 1/762 52/481.1 |
| 2007/0234667 A1* | 10/2007 | Lubker, II | ............... | E04B 2/706 52/408 |
| 2008/0245007 A1* | 10/2008 | McDonald | ............. | E04C 2/246 52/309.5 |
| 2008/0302037 A1* | 12/2008 | Brown | ...................... | E04B 5/12 52/289 |
| 2009/0008405 A1* | 1/2009 | Mathus | ................... | B01L 3/505 221/197 |
| 2009/0064618 A1* | 3/2009 | Ben-Daat | ................. | B32B 5/18 52/408 |
| 2009/0077916 A1* | 3/2009 | Scuderi | ................. | E04B 1/0007 52/309.9 |
| 2009/0113831 A1* | 5/2009 | DeWildt | ................... | B32B 5/20 52/506.01 |
| 2010/0058699 A1* | 3/2010 | Cropper | ................. | B32B 21/14 52/506.1 |
| 2012/0021172 A1* | 1/2012 | Willson | ................. | B32B 13/14 428/131 |
| 2012/0032481 A1 | 2/2012 | D'Agostini | | |
| 2012/0247042 A1* | 10/2012 | Clancy | .................. | E04B 1/6104 52/309.4 |
| 2012/0291384 A1* | 11/2012 | Martens | .................. | E04C 2/386 52/309.1 |
| 2012/0324814 A1* | 12/2012 | Amend | ............... | E04F 13/0875 52/302.1 |
| 2013/0227902 A1* | 9/2013 | Van Sloun | ................ | E04C 2/296 52/309.4 |
| 2013/0316134 A1* | 11/2013 | Anderson | ................. | B32B 5/20 428/138 |
| 2013/0316143 A1* | 11/2013 | Budinscak, Jr. | ........ | B29C 66/71 428/159 |
| 2014/0059958 A1* | 3/2014 | Ratto Anduaga | ....... | E04C 2/288 52/309.3 |
| 2014/0141199 A1* | 5/2014 | Leonard | .................. | B32B 27/08 428/138 |
| 2015/0047281 A1* | 2/2015 | Cole | ....................... | E04F 13/148 52/302.1 |
| 2015/0082724 A1* | 3/2015 | Amend | ................... | E04C 2/243 52/404.1 |

(56) References Cited

U.S. PATENT DOCUMENTS

| | | | |
|---|---|---|---|
| 2015/0093535 A1* | 4/2015 | Lambach | E04C 2/386 |
| | | | 428/71 |
| 2015/0121792 A1* | 5/2015 | Spoo | E04B 1/4178 |
| | | | 52/483.1 |
| 2015/0128418 A1 | 5/2015 | Okamura et al. | |
| 2015/0135623 A1* | 5/2015 | Garrett | E04C 2/00 |
| | | | 52/474 |
| 2015/0135634 A1* | 5/2015 | Hoie | E04C 2/205 |
| | | | 52/741.4 |
| 2015/0144249 A1* | 5/2015 | Bowe | B32B 37/24 |
| | | | 156/71 |
| 2015/0204064 A1* | 7/2015 | Nobbee | E04B 1/78 |
| | | | 428/158 |
| 2015/0233110 A1* | 8/2015 | Alter | E04B 1/7658 |
| | | | 52/404.2 |
| 2015/0240483 A1* | 8/2015 | Riepe | E04B 1/7604 |
| | | | 52/309.12 |
| 2015/0284950 A1* | 10/2015 | Stramandinoli | E04B 2/965 |
| | | | 52/235 |
| 2015/0300005 A1* | 10/2015 | Fetterman | E04B 1/7641 |
| | | | 52/717.04 |
| 2015/0353776 A1* | 12/2015 | Gawryla | B32B 37/12 |
| | | | 442/1 |
| 2015/0354208 A1* | 12/2015 | Brooks, III | E06B 1/02 |
| | | | 52/215 |
| 2015/0354211 A1* | 12/2015 | Nandi | E04B 2/38 |
| | | | 52/232 |
| 2015/0376898 A1* | 12/2015 | Kreizinger | E04C 2/24 |
| | | | 52/483.1 |
| 2017/0002561 A1* | 1/2017 | Hettler | E04B 1/80 |
| 2017/0241135 A1* | 8/2017 | Budinscak, Jr. | E04C 2/243 |

FOREIGN PATENT DOCUMENTS

| | | |
|---|---|---|
| CA | 1306338 | 8/1992 |
| CA | 1323297 | 10/1993 |
| CA | 2136778 | 5/1996 |
| CN | 101818527 | 9/2010 |
| CN | 204174823 | 2/2015 |
| CZ | 9904458 | 4/2000 |
| DE | 2723590 | 11/1978 |
| EP | 170342 | 2/1986 |
| EP | 315239 | 5/1989 |
| EP | 2113375 | 11/2009 |
| EP | 2851482 | 3/2015 |
| EP | 2886733 | 6/2015 |
| GB | 2393456 | 3/2004 |
| GB | 2524025 | 9/2015 |
| KR | 20110002545 | 1/2011 |
| KR | 20150118353 | 10/2015 |
| RU | 2034859 | 5/1995 |
| RU | 2005127230 | 3/2007 |
| WO | 02/14618 | 2/2002 |
| WO | 02/22976 | 3/2002 |
| WO | 2007/142761 | 12/2007 |
| WO | 2010/014363 | 2/2010 |
| WO | 2012/001399 | 1/2012 |
| WO | 2013/053566 | 4/2013 |
| WO | 2015/095911 | 7/2015 |
| WO | 2015/107369 | 7/2015 |

OTHER PUBLICATIONS

Dr. J. Technical Evaluation Report, Thermo-Sheath (Red) Structural Sheathing, dated Nov. 20, 2013, copyright 2015, 17 pgs.

DURA PRO Technical Data Sheet, UH-2153-5 PURPLE, issued Aug. 31, 2010, 1 pg. IFS Industries, Inc.

* cited by examiner

STRUCTURAL INSULATED SHEATHING

RELATED APPLICATIONS

The present application claims the benefit of U.S. Provisional Patent Application No. 62/288,758, filed Jan. 29, 2016, titled Structural Insulated Sheathing, which is incorporated herein by reference in its entirety.

BACKGROUND OF THE INVENTION

In building construction, such as residential buildings, structural sheathing is commonly used to cover the structural framework of the exterior walls of the building. Structural sheathing, such as for example, plywood, exterior gypsum board, and oriented strand board (OSB), improves the strength of a building's framing. The majority of structural sheathing, however, does not add a significant amount of insulation value to the home. To add additional insulation, beyond that placed in the cavity between wall studs, a rigid foam insulation board, such as for example extruded or expanded polystyrene, polyisocyanurate, or polyurethane foam, may be nailed, stapled, or otherwise attached onto the exterior of the structural sheathing.

SUMMARY

A structural insulated sheathing including a rigid foam insulation board having a first face and a structural member having a second face. The structural member comprises multiple plies of cellulose fiber laminated together. The first face of the foam insulation board is laminated to the second face of the structural member either partially or over substantially 100% of the interface between the first face and the second face.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify the principles of this invention.

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements.

The present application discloses exemplary embodiments of structural insulated sheathing 10. The structural insulated sheathing 10 can be used in a wide variety of different applications. In one exemplary embodiment, the structural insulated sheathing 10 is used as sheathing boards that are applied either continuously or intermittently to outer studs, joists, rafters, and other frame members of a building (discussed below) as required by a structural analysis of the wall. The structural insulated sheathing 10, however, can also be used in a wide variety of other applications. For example, the structural insulated sheathing 10 may be used as panels on the interior of a building.

Figure 1:
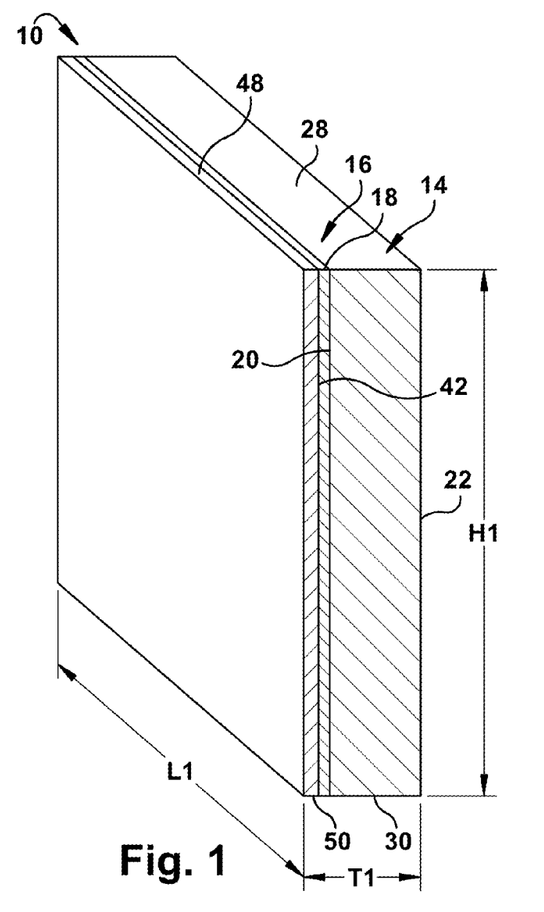
FIG. 1 is a cross section of an exemplary embodiment of a structural insulated sheathing.
Figure 2:
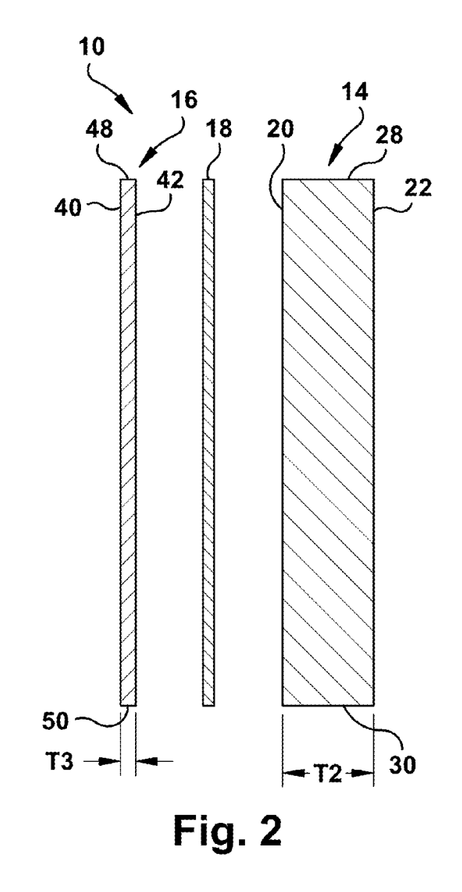
FIG. 2 is an exploded view of the structural insulated sheathing of FIG. 1.

Referring to FIGS. 1 and 2, one exemplary embodiment of a structural insulated sheathing 10 includes an insulation member 14 attached to a structural member 16 by an adhesive 18. The structural insulated sheathing 10 has a thickness T1, a height H1, and a length L1. The insulation member 14 may be configured in a variety of ways. For example, the insulation member 14 can be made from a wide variety of different materials and combinations of materials. In one exemplary embodiment, the insulation member 14 is a rigid foam insulation board. Examples of suitable materials for the insulation member 14 include, but are not limited to, polystyrene, extruded polystyrene, expanded polystyrene, molded polystyrene, polyisocyanurate, polyurethane, any open or closed cell foam material, reinforced foam materials, such as polystyrene, extruded polystyrene, expanded polystyrene, molded polystyrene, polyisocyanurate, and polyurethane with a reinforcement skin laminated on one or both sides.

The insulation member 14 may be a variety of different shapes and thicknesses. For example, the insulation member 14 may be any suitable shape, such as triangular, square, rectangular, hexagonal, etc. In addition, the edges of the insulation member 14 may include projections, grooves, and/or channels. The insulation member 14 may be any suitable thickness, such as for example, 0.5", 0.75", or 1.0" or greater, such as for example 4.0" thick.

In the exemplary embodiment, the insulation member 14 is generally box-shaped (i.e., rectangular faces and edges) having a thickness T2 and including a first face 20, a second face 22 spaced apart from and parallel to the first face 20, a first side edge 24 extending between the first face 20 and the second face 22 (see FIG. 3), a second side edge 26 spaced apart from and generally parallel to the first side edge 24 and extending between the first face 20 and the second face 22 (see FIG. 3), a top edge 28 extending between and generally perpendicular to the first face 20 and the second face 22, and a bottom edge 30 spaced apart from and generally parallel to the top edge 28 and extending between the first face 20 and the second face 22.

The structural member 16 may be configured in a variety of ways. In the exemplary embodiment, the structural member 16 has a thickness T3 less than the thickness T2 of the insulation member 14. In some embodiments, for example, the thickness T3 of the structural member 16 is less than ½ of, less than ¼ of, or less than ⅛ of the thickness T2 of the insulation member 14. For example, in some embodiments, the structural member 16 may be 0.137" thick or less. In one exemplary embodiment, the insulation member 14 has a thickness T2 of 1.0", or approximately 1.0", and the structural member 16 has a thickness of 0.105", or approximately 0.105".

The structural member 16 can be made from a wide variety of different materials and combinations of materials. For example, suitable materials may include, but not be limited to, wood, woven or nonwoven materials, reinforced or non-reinforced materials, fiberglass reinforced plastic (FRP), plastic, recycled plastics, or other suitable materials. In some embodiments, for example, the structural member 16 may include multiple plies of cellulose fiber or paperboard layers laminated together. Examples of suitable cellulose fiber structural members include, but are not limited to, Thermo-ply® from Ox Engineered Products LLC and Thermo-Sheath® from National Shelter Products, Inc.

In the exemplary embodiment, the structural member 16 is generally box-shaped (i.e., rectangular faces and edges) and includes a first face 40, a second face 42 spaced apart from and parallel to the first face 40, a first side edge 44 (not shown) extending between the first face 40 and the second face 42, a second side edge 46 (not shown) spaced apart from and generally parallel to the first side edge 44 and extending between the first face 40 and the second face 42, a top edge 48 extending between and generally perpendicular to the first face 40 and the second face 42, and a bottom edge 50 spaced apart from and generally parallel to the top edge 48 and extending between the first face 40 and the second face 42.

The adhesive 18 used to attach the structural member 16 to the insulation member 14 may be any suitable adhesive. In one exemplary embodiment, the adhesive 18 is configured and applied to enhance the structural strength of the structural insulated sheathing 10. For example, the adhesive may be a cross-linking adhesive. In one exemplary embodiment, the adhesive is a cross-linking, reactive, hot melt, moisture cured polyurethane adhesive. An example of a suitable adhesive is, but not limited to, UH-2153-5 Purple from IFS Adhesives, Inc.

The insulation member 14 and the structural member 16 are adhered together such that the first face 20 of the insulation member 14 is adhered to the second face 42 of the structural member 16. In one exemplary embodiment, 100%, or substantially 100%, of the interface between the first face 20 of the insulation member 14 and the second face 42 of the structural member 16 is adhered together by the adhesive 18. Thus, the adhesive 18 is applied over 100%, or substantially 100%, of the surface area where the first face 20 of the insulation member 14 contacts or directly overlays the second face 42 of the structural member 16. The term "substantially 100%," and its use herein, it is meant to include a small deviation from the entire interface between the first face 20 and the second face 42 where adhesive may have been omitted, such as for example 98% or greater.

In the illustrated exemplary embodiment, the first face 20 of the insulation member 14 is sized and shaped the same as the second face 42 of the structural member 16 and the adhesive 18 bonds 100%, or substantially 100%, of the first face 20 to 100%, or substantially 100%, of the second face 42. In other embodiments, however, less than 100% of the first face 20 may interface with the second face 42, or less than 100% of the second face. For example, in some embodiments, one or more edges of the insulation member 14 may extend beyond the corresponding edge of the structural member 16 or vice versa. Or, in some embodiments, one or more of the edges of the insulation member 14 may be notched behind the corresponding edge of the structural member 16 to provide a gap where a connecting piece (not shown) can be placed to connect and/or seal two adjacent panels.

Figure 3:
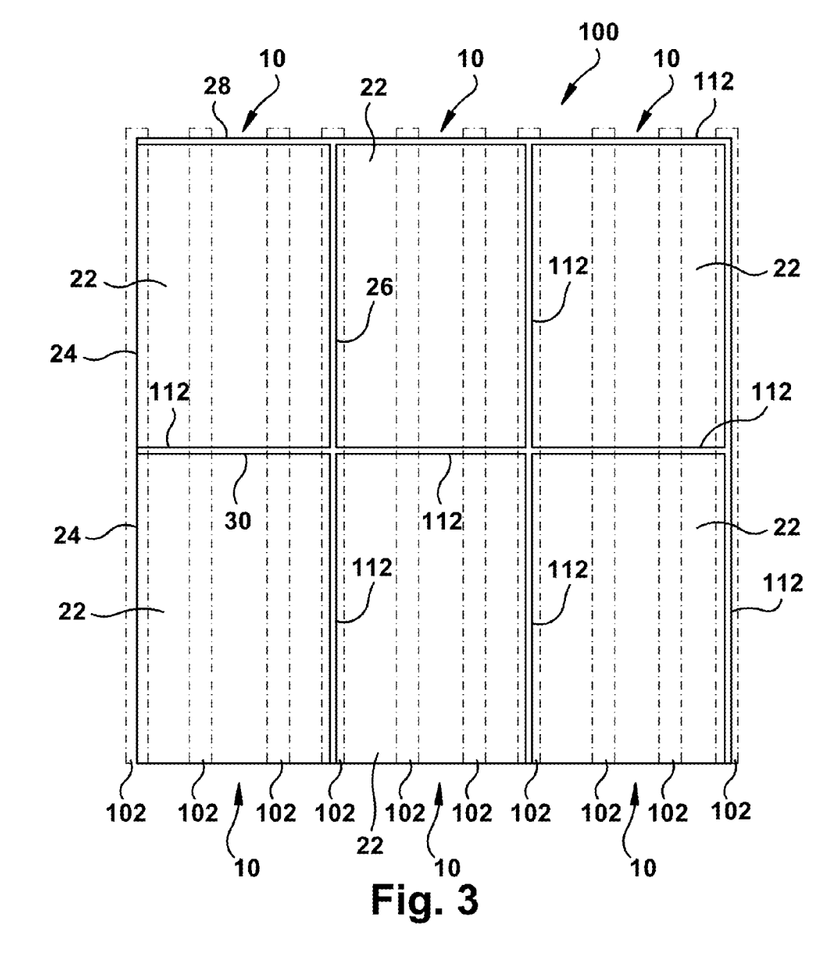
FIG. 3 is an exemplary embodiment of a sheathing system utilizing the structural insulated sheathing of FIG. 1.
Figure 4:
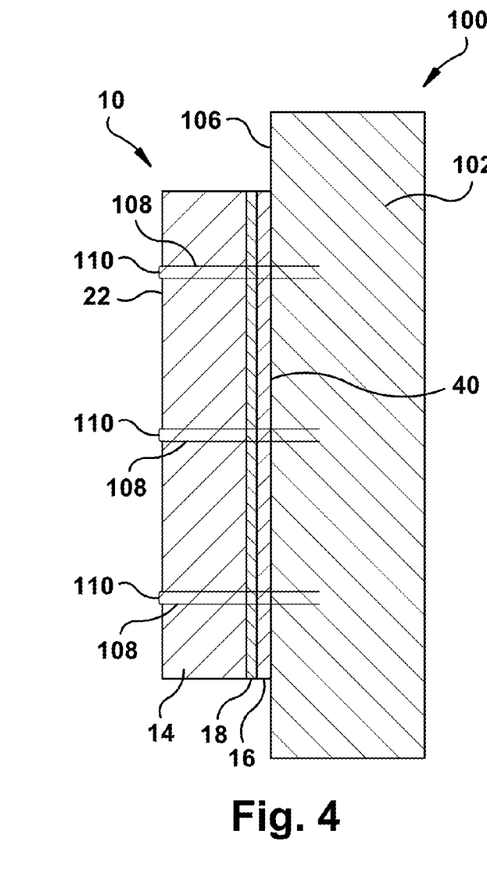
FIG. 4 is a side cross section of the sheathing system of FIG. 3.

Referring to FIGS. 3 and 4, a structural sheathing system 100 is illustrated that includes a plurality of structural insulated sheathings 10 attached to frame members 102 of a building. The frame members 102 may take a variety of different forms. For example, the frame members 102 may comprise conventional wood or metal framing studs that are typically used to frame houses and other buildings. Any type of material capable of supporting the structural insulated sheathing 10 may be used. The structural insulated sheathing 10 may be assembled to a front face 106 of the frame members 102 with fasteners 108, such as, for example, staples, nails, screws, adhesive, or other suitable fasteners. In the illustrated embodiment, the fasteners 108 are illustrated as staples having a crown portion 110 that when installed is flush with, or embedded in, the second face 22 of the insulation member 14.

As shown in FIG. 3, when installed, each structural insulated sheathing 10 is positioned against or adjacent an edge of one or more other structural insulated sheathings 10 and is then fastened to the frame members 102 (as shown in FIG. 4). In the illustrated embodiment, the structural insulated sheathing 10 is attached to the frame members 102 with the structural member 16 facing toward the frame members 102 and the insulation member 14 facing outward (i.e., the first face 40 of the structural members 16 facing and/or engaging the front face 106 of one or more framing members 102). Thus, the fasteners 108 extend through the insulation member 14, through the structural member 16, and into the frame members 102 with the crown portion 110 of the fasteners 108 flush with, or embedded in, the second face 22 of the insulation member 14. In other embodiments, however, the structural insulated sheathing 10 may be attached to the frame members 102 with the insulation member 14 facing toward the frame members 102 and the structural member 16 facing outward (i.e., the second face 22 of the insulation members 14 facing and/or engaging the front face 106 of one or more framing members 102). Thus, the fasteners 108 extend through the structural member 16, through the insulation member 14, and into the frame members 102 with the crown portion 110 of the fasteners 108 flush with, or embedded in, the first face 40 of the structural member 16.

The joints between adjacent structural insulated sheathing 10 (i.e., the space between the edges of adjacent structural insulated sheathing 10) may be sealed to create a barrier for air and water. The joints may be sealed in any suitable manner, such as, for example, with a sealant, covered by a tape, compression of a gasket either attached to the structural insulated sheathing 10 or to the framing member 102, or with a connecting member. In one exemplary embodiment, the joints formed between adjacent structural insulated sheathing 10 may be sealed with a foam joint tape 112 such as, for example, HomeSealR™ Foam Joint Tape or JointSealR™ Foam Joint Tape from Owens Corning Corporation. The joints may also be sealed by placing a connector in a gap formed by notching an edge of the insulated member 14 behind the edge of the structural member 16. The seal is formed by nailing, stapling, or otherwise fastening the structural insulated sheathing 10 through the structural member 16, through the connector (not shown), through the insulation member 14, and into the frame members 102.

Furthermore, joints may also be sealed by a gasket or sealant placed between two adjacent structural insulated sheathings 10 or between the structural insulated sheathing 10 and the frame members 102. The gasket or sealing material may be pre-applied to the structural insulated sheathing 10 during manufacturing or may be applied at the job-site. For example, U.S. Pat. No. 9,476,202, to Clancy et al., the disclosure of which is incorporated herein by reference in its entirety, describes a foam board with pre-applied sealing material capable of creating a barrier for air and water when applied to the structural insulated sheathing 10 of the present disclosure.

Testing Example #1

Racking strength tests using ASTM E72 Racking Test apparatus were conducted with a wall configuration of 2" by 4" wood studs with stud spaces at 16" on center (o.c.). The structural insulated sheathing 10 applied to the wall included a 4'×8' sheathing made from a 1" thick extruded polystyrene board glued to ThermoSheath Red structural sheathing (the total thickness of structural insulated sheathing 10 was 1.105"). The structural insulated sheathing 10 sample was fastened to the wood frame wall using 16 gauge, 1" crown, 2" long metal staples. The staples were spaced apart 3" o.c. along the perimeters and 3" o.c. in the field. The crown of the staples were installed flush with the foam surface.

Figure 5:
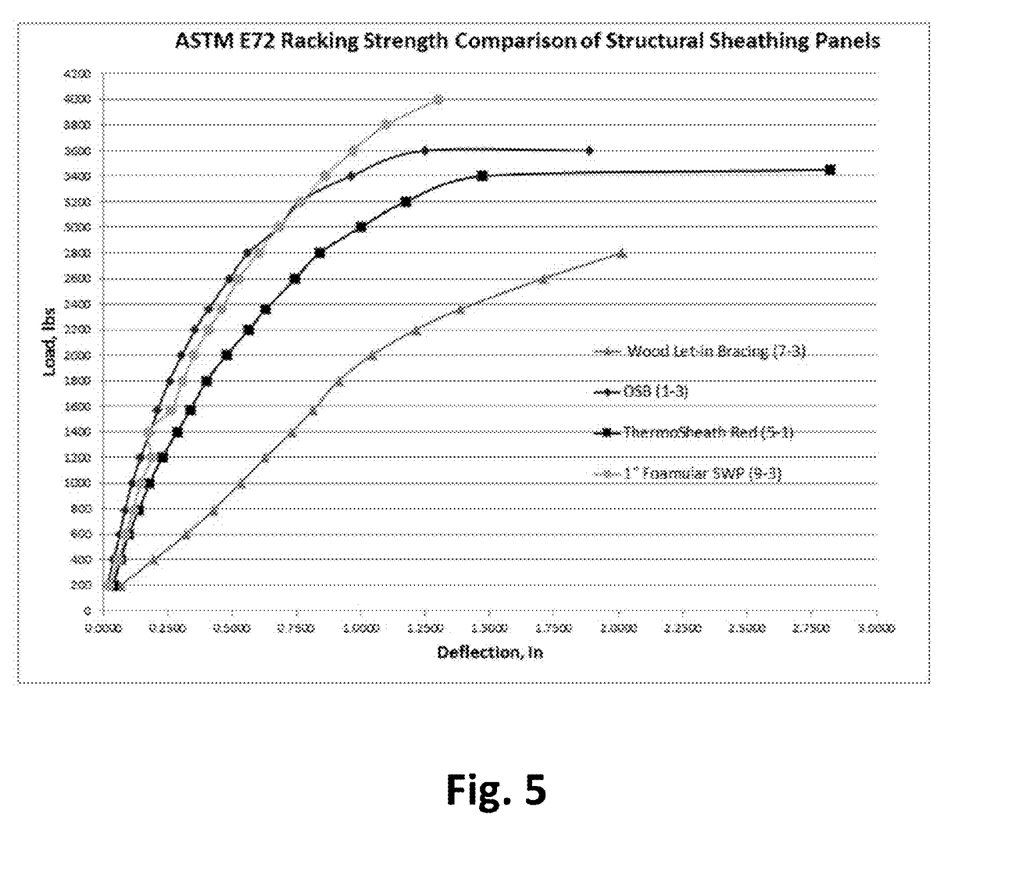
FIG. 5 is a graph illustrating wall racking test results conducted on various structural sheathing panels per ASTM E72 Section 14 test method.

Wall racking tests were conducted on the walls described above per ASTM E72 Section 14. In addition, similar tests were conducted on walls sheathed with 7/16" OSB and other wall configurations. Referring to FIG. 5, the data showed that the 1" thick XPS foam/ThermoSheath Red sample provided as much as approximately a 17% improvement in maximum load over ThermoSheath Red and produced a comparable to improved maximum load to 7/16" OSB.

Testing Example #2

Three small scale tests were run on structural insulated sheathing 10 samples under ASTM E564 test protocol (4'×8' wall section)(without gypsum board on the interior wall). The structural insulated sheathing 10 samples were made from a 1" thick, extruded polystyrene board glued to ThermoSheath Red structural sheathing by a reactive hot melt polyurethane adhesive over 100% of the interface between the extruded polystyrene board glued to ThermoSheath Red. The structural insulated sheathing 10 sample was fastened to the wood frame wall using 16 gauge, 1" crown, 2" long metal staples. The staples were spaced apart 3" o.c. along the perimeters and 3" o.c. in the field. The crown of the staples were installed flush with the foam surface.

The results achieved, shown in Table 1 below, showed the racking strength of the structural insulated sheathing 10 samples to be comparable to a typical test result for 7/16" OSB tested under the same conditions.

TABLE 1

| Sample | Max load, pounds per (linear) foot (plf) |
| --- | --- |
| SIS Sample 1 | 509 |
| SIS Sample 2 | 491 |
| SIS Sample 3 | 501 |
| OSB, 7/16" | ~500 (est.) |

Figure 6:
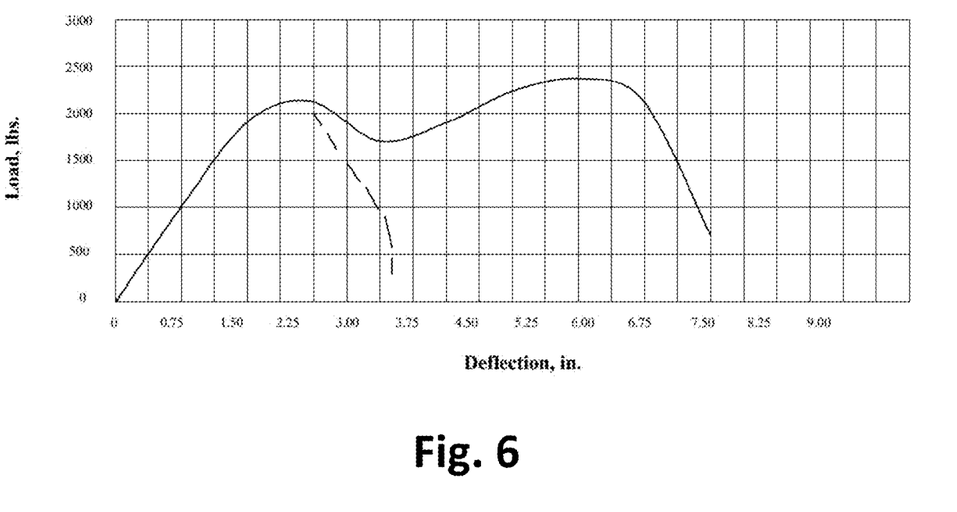
FIG. 6 is a graph illustrating a typical wall deflection vs. the load curve for the structural insulated sheathing of FIG. 1.

Referring to FIG. 6, during the course of testing with the structural insulated sheathing 10 samples (configured as described above) and with the ThermoSheath Red facing toward the frame members and the XPS foam board facing outward, the deflection of the wall was plotted vs. the load applied, with a depiction of a typical plot shown in FIG. 6.

Referring to FIG. 6, the test results showed an initial load peak which typically occurred just prior to the crown of the 1" staple pulling through the second face (outer facing face) of the insulation member. The amount of the initial load peak and location of the initial peak with respect to deflection was at least partially attributed to the staples being applied with the crown flush to the outward face of the structural insulated sheathing as opposed to the crown of the staples being embedded into the structural insulated sheathing.

Once the staple crown pulled through the outward face, the load dropped off as deflection increased. For typical homogeneous materials, once pull through of the fastener has begun, the load would continue to rapidly decrease, as shown by the dashed line in FIG. 6. For the structural insulated sheathing 10 samples, however, as the staple continued to pull through the insulation member and the crown of the staple reached the interface between the insulation member and the structural member and engaged the second face of the structural member, the load rebounded as shown by the second peak. In the samples tested, the second peak load was equal to or greater than the initial peak load. This was attributed to the structural member acting as a secondary plane to keep the crown of the staple from pulling through the material.

Testing Example #3

Racking strength tests using ASTM E72 Racking Test apparatus were conducted with a wall configuration of 2" by 4" wood studs with stud spaces at 16" o.c. The structural insulated sheathing 10 applied to the wall included a 4'×8' sheathing made from a 1" thick extruded polystyrene board glued to ThermoSheath Red structural sheathing (total thickness of structural insulated sheathing 10 was 1.105") over substantially 100% of the interface between the extruded polystyrene board and the ThermoSheath Red structural sheathing. The structural insulated sheathing 10 sample was fastened to the wood frame wall using 16 gauge, 1" crown, 2" long metal staples. The staples were spaced apart 3" o.c. along the perimeters and 3" o.c. in the field. The crown of the staples were installed flush with the foam surface.

Figure 7:
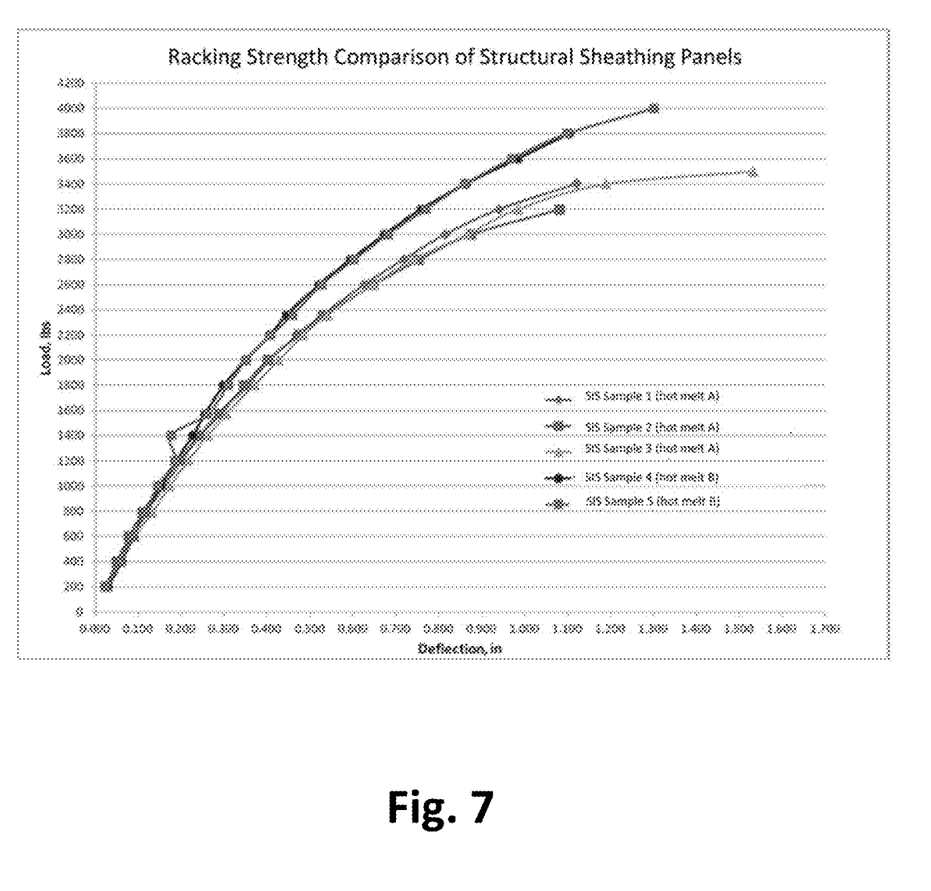
FIG. 7 is a graph illustrating wall racking test results on structural sheathing per ASTM E72 Section 14 test method comparing two different hot melt adhesives.

Referring to FIG. 7, five separate wall racking tests were conducted on the walls described above per ASTM E72 Section 14. Three structural insulated sheathing samples utilized hot melt adhesive A, a permanent, pressure sensitive hot melt adhesive, which is considered a conventional hot melt adhesive, to attach the polystyrene board to the ThermoSheath Red structural sheathing. Two structural insulated sheathing samples utilized hot melt adhesive B, a cross-linking, reactive, hot melt polyurethane adhesive to attach the polystyrene board to the ThermoSheath Red structural sheathing. The data showed that the samples utilizing the hot melt adhesive B (samples 4 and 5) produced up to approximately 15% increase in the load at failure versus the samples utilizing hot melt adhesive A (samples 1-3).

Conventional thinking is that rigid foam insulation boards provide minimal structural strength when applied over the structural framework of a building. The tests, however, show that the structural insulated sheathing 10 utilizing a rigid extruded polystyrene foam board glued to ThermoSheath Red by a reactive hot melt applied on substantially 100% of the interface between the extruded polystyrene foam board and ThermoSheath Red provides unexpected improvement over ThermoSheath Red alone. In particular, in the tests, the 1″ thick extruded polystyrene foam board/ThermoSheath Red structural insulated sheathing 10 showed improved structural strength (racking strength) versus ThermoSheath Red alone while showing comparable structural strength to 7/16″ thick OSB. Furthermore, in at least some embodiments, the R-value of the structural insulated sheathing 10 is substantially better than either ThermoSheath Red or 7/16″ thick OSB alone, while providing increased stiffness and rigidity over a conventional foam insulation board alone.

In addition, the two distinct material layers of the non-homogenous structural insulated sheathing 10 provide improved fastener pull resistance as the staple crown must pull through two different materials. Fastener pull resistance may be further enhanced in the structural insulated sheathing 10 by laminating, or otherwise attaching, an optional film or fabric (not shown) of sufficient integrity to the second face 22 of the insulation member 14. The optional film or fabric (not shown) may act to resist the fastener from pulling through the second face 22 of the insulation member 14, thus increasing peak load. In addition, the stiffness and rigidity of the crown/head 108 of the fastener 108 may be designed to resist deflection or may provide a larger bearing surface, thus enhancing the pull through strength of the fastener.

The cross-linking adhesive applied over 100% of the surface area of the interface between the insulation member and the structural member creates a bond between the two members that enhances the load transfer and results in improved structural performance (approximately 15% improvement) versus use of a conventional hot melt adhesive. A cross-linking adhesive serves to make the adhesive more stiff and rigid, which in turn makes the structural insulated sheathing 10 more stiff and rigid to further resist buckling under racking load.

Figure 8:
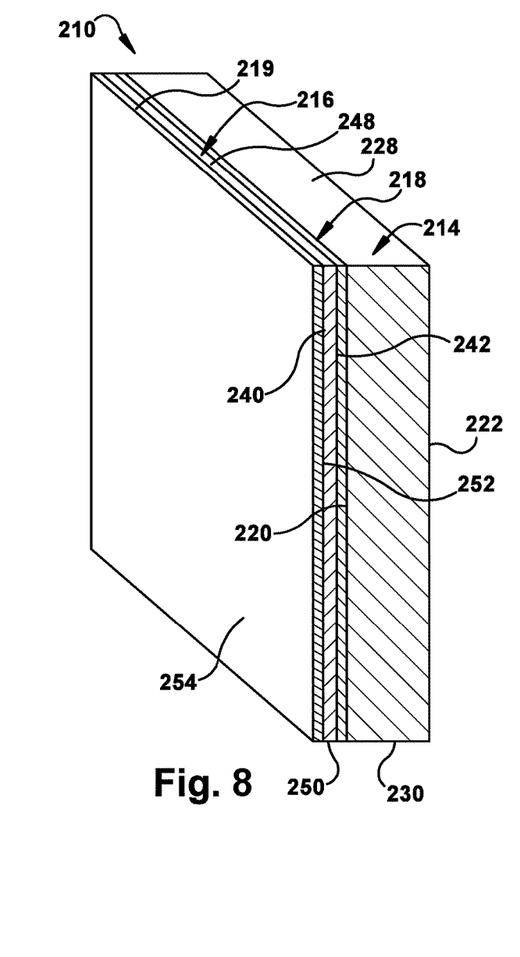
FIG. 8 is a cross section of an exemplary embodiment of a structural insulated sheathing.
Figure 9:
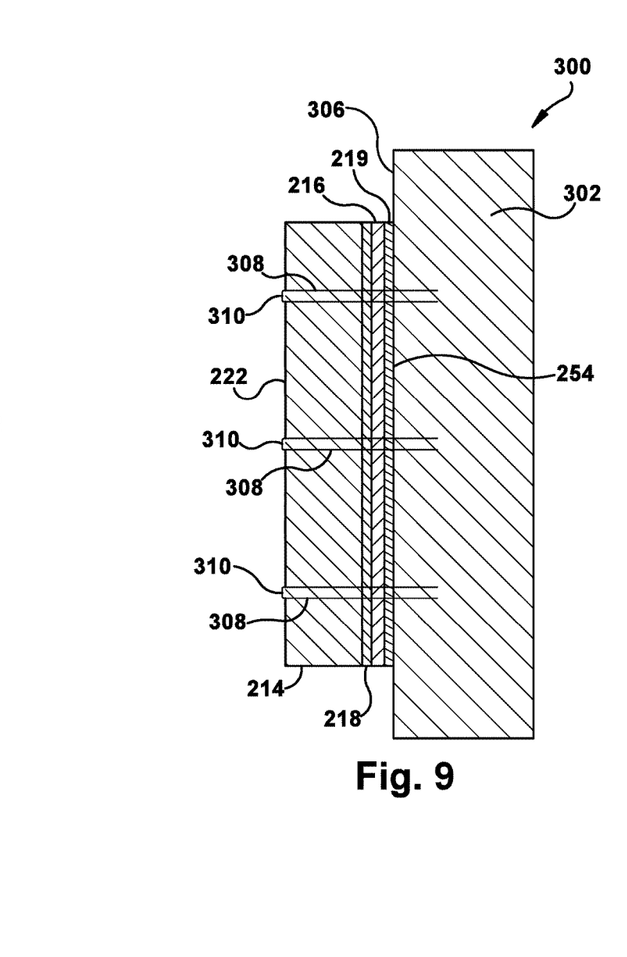
FIG. 9 is a side cross section of an exemplary embodiment of a sheathing system utilizing the structural insulated sheathing of FIG. 8.

Referring to FIGS. 8 and 9, another exemplary embodiment of a structural insulated sheathing 210 is shown. The structural insulated sheathing 210 is similar to the structural insulation sheathing 10 of FIGS. 1 and 2 in that it includes an insulation member 214 attached to a structural member 216 by an adhesive 218. In particular, in the illustrated embodiment, the insulation member 214 is generally box-shaped (i.e., rectangular faces and edges) having a thickness T2 and including a first face 220, a second face 222 spaced apart from and parallel to the first face 220, a top edge 228 extending between and generally perpendicular to the first face 220 and the second face 222, and a bottom edge 230 spaced apart from and generally parallel to the top edge 228 and extending between the first face 220 and the second face 222.

The structural member 216 is generally box-shaped (i.e., rectangular faces and edges) and includes a first face 240, a second face 242 spaced apart from and parallel to the first face 240, a top edge 248 extending between and generally perpendicular to the first face 240 and the second face 242, and a bottom edge 250 spaced apart from and generally parallel to the top edge 248 and extending between the first face 240 and the second face 242.

The insulation member 214 and the structural member 216 are adhered together such that the first face 220 of the insulation member 214 is adhered to the second face 242 of the structural member 216. In one exemplary embodiment, 100%, or substantially 100%, of the interface between the first face 220 of the insulation member 214 and the second face 242 of the structural member 216 is adhered together by the adhesive 218. Thus, the adhesive 218 is applied over 100%, or substantially 100%, of the surface area where the first face 220 of the insulation member 214 contacts or directly overlays the second face 242 of the structural member 216.

The insulation member 214, the structural member 216, and the adhesive 218 may be configured the same, such as for example, the same materials, size, and shape, as the insulation member 14, the structural member 16, and the adhesive 18 of structural insulated sheathing 10.

The structural insulated sheathing 210 also includes a gasket 219 designed to create an air barrier. The gasket 219 may be configured in a variety of ways. Any gasket capable of creating an air barrier between the structural insulated sheathing 210 and frame members 302 of a building when the structural insulated sheathing 210 is attached to frame members 302 may be used. In one exemplary embodiment, the gasket 219 is a flexible, compressible polymer, such as for example, polyethylene foam.

In the exemplary embodiment of FIGS. 8 and 9, the gasket 219 is a polyethylene foam including a first face 252 and a second face 254 spaced apart from and parallel to the first face 252. The first face 252 of the gasket 219 is laminated to and covers substantially 100% of the first face 240 of the structural member 216. In other embodiments, however, the gasket 219 may be laminated to and/or cover less than substantially 100% of the first face 240. The gasket 219 may be laminated to the structural member 216 by any suitable means, such as for example, by any suitable adhesive.

Referring to FIG. 9, a structural sheathing system 300 includes a plurality of structural insulated sheathings 210 attached to frame members 302 of a building. The structural insulated sheathing 210 may be assembled to a front face 306 of the frame members 302 with fasteners 308, such as, for example, staples, nails, screws, adhesive, or other suitable fasteners. In the illustrated embodiment, the fasteners 308 are illustrated as staples having a crown portion 310 that when installed is flush with, or embedded in, the second face 222 of the insulation member 214.

The structural insulated sheathing 210 is attached to the frame members 302 with the gasket 219 facing toward the frame members 302 and the second face 222 of the insulation member 214 facing outward. The second face 254 of the gasket 219 engages the front face 306 of one or more framing members 302 to form an air barrier at the interface between the structural insulated sheathing 210 and the frame members 302. The fasteners 308 extend through the insulation member 214, through the structural member 216, through the gasket 219, and into the frame members 302 with the crown portion 310 of the fastener 308 flush with, or embedded in, the second face 222 of the insulation member 214.

Any one or more of the features of the different embodiments of structural insulated sheathing 10, 210 and sheathing systems 100, 300 disclosed by the application may be used in any combination or sub-combination. Further, while the present invention has been illustrated by the description of embodiments thereof, and while the embodiments have been described in considerable detail, it is not the intention of the Applicant to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the Applicant's general inventive concept.

The invention claimed is:

1. A structural insulated sheathing comprising:
a rigid foam insulation board having a first face and a second face; and
a rigid structural member having a first face and a second face,
wherein the first face of the rigid foam insulation board is laminated to the second face of the rigid structural member by an adhesive that covers at least 98% of the first face of the rigid foam insulation board, and
wherein the second face of the rigid foam insulation board is not laminated to a rigid structural member,
wherein, a maximum racking shear strength of the structural insulated sheathing occurs after a crown or a head of a fastener pulls through the second face of the rigid foam insulation, where the maximum racking shear strength of the structural insulated sheathing is determined by fastening the structural insulated sheathing to a wood frame wall, with the first face of the rigid structural member facing the wood frame wall, using the fastener having the crown, or the head installed flush with the second face of the rigid foam insulation board, and applying a load to the wood frame wall such that the crown or the head of the fastener pulls through the structural insulated sheathing.

2. The structural insulated sheathing of claim 1, wherein the rigid structural member comprises multiple plies of cellulose fiber laminated together.

3. The structural insulated sheathing of claim 1, wherein the rigid foam insulation board is extruded polystyrene.

4. The structural insulated sheathing of claim 1, wherein the adhesive is a cross-linking polyurethane adhesive.

5. The structural insulated sheathing of claim 1, wherein the structural insulated sheathing, has a racking shear strength of at least 3,500 lbs.

6. The structural insulated sheathing of claim 1, wherein an air barrier is formed by compression of a gasket positioned between the structural insulated sheathing and at least one frame member.

7. The structural insulated sheathing of claim 6, wherein the gasket is laminated to the rigid structural member.

8. The structural insulated sheathing of claim 6, wherein the gasket is attached to the at least one frame member.

* * * * *